June 19, 1934.  F. F. BEAUCHAMP  1,963,642
ELECTROMAGNETIC TRANSMISSION
Filed Nov. 2, 1931
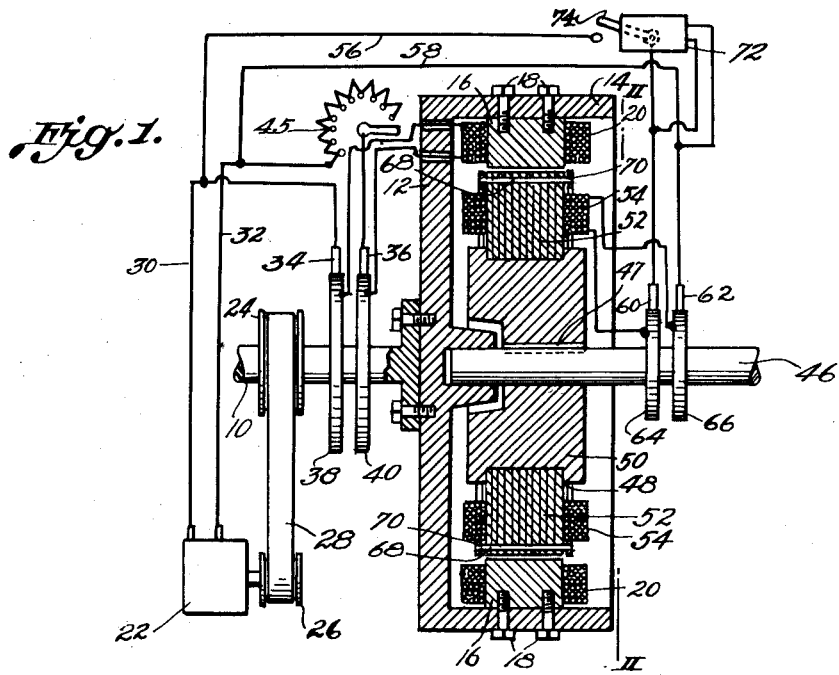
Fig. 1.
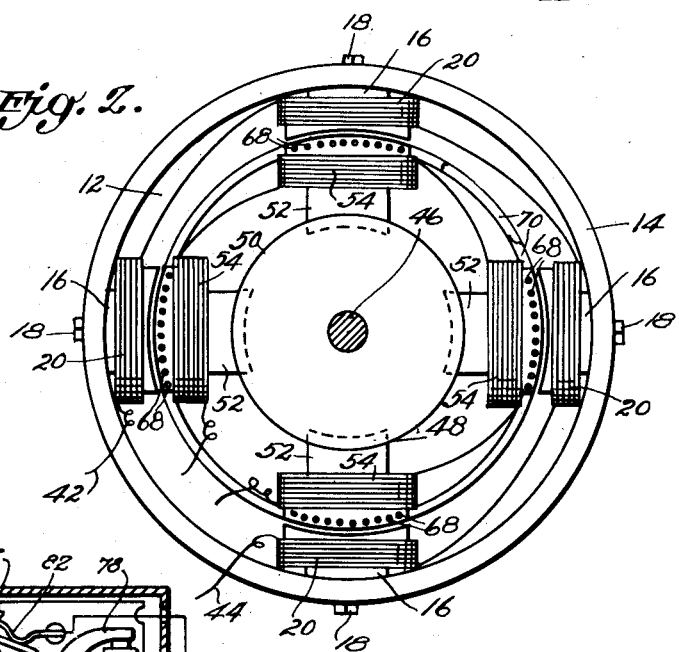
Fig. 2.
Fig. 3.
INVENTOR,
Fannon F. Beauchamp.
BY
Hovey & Hamilton,
ATTORNEYS.

Patented June 19, 1934

1,963,642

UNITED STATES PATENT OFFICE 1,963,642

ELECTROMAGNETIC TRANSMISSION

Fannon F. Beauchamp, Kansas City, Kans.

Application November 2, 1931, Serial No. 572,528

4 Claims. (Cl. 172—284)

This invention relates to electro-magnetic transmissions and particularly to that type of power transmissions operable by rotary, electro-magnetic members.

The principal object of the present invention is the provision of an electro-magnetic power transmission whereby the speed of the driving and driven members are synchronized without the use of any mechanical connections therebetween.

Another object of this invention is the provision of an electro-magnetic power transmission having means whereby the driven member may be moved at a gradually increasing rate of speed as the driving member maintains a substantially constant rate of speed and whereby the driving and driven members will be locked together when a predetermined relative speed is attained.

Further objects of the invention are to provide a simple and efficient transmission which affords great flexibility and durability and eliminates vibrating to a large extent. Referring to the drawing:

Figure 1 is a sectional view of an electric power transmission with the electrical circuit diagrammatically shown and embodying this invention.

Fig. 2 is a sectional view partly broken away, taken on line II—II of Fig. 1 with the electrical circuit shown diagrammatically.

Fig. 3 is a diagrammatical view of the frequency responsive switch with some of the connecting parts.

In the drawing like reference characters refer to similar parts and the numeral 10 indicates a power driving shaft which is driven by any suitable prime mover, such as steam engine, internal combustion engine, electric motor, etc., not shown. Securely mounted on driving shaft 10 is a housing 12, preferably made of iron and having a tubular portion 14 which is adapted to be rotated concentrically with drive shaft 10.

Within the tubular portion 14 of housing 12 is a series of electro-magnetic poles 16 which are securely attached in radial position by screw 18 or by any other suitable means. About each of the poles 16 is wound a coil 20 of suitable electric conducting nature. These coils are connected in series in such a manner that when a direct current is passed through the circuit, adjacent inner portions of poles 16 will be of opposite polarity. As shown in Fig. 1, an exciter dynamo 22, driven by the driving shaft 10 through the intermediacy of pulleys 24 and 26 and belt 28, is in electrical connection with coils 20 through wires 30 and 32 which connect with brushes 34 and 36 respectively. These brushes in turn contact slip collector rings 38 and 40 respectively. Rings 38 and 40 rotate with the housing and are connected respectively with wires 42 and 44 so that when the shaft 10 is rotated a circuit will pass through all of the coils 20 thereby producing a series of electro-magnets alternately of north and south poles and revolving at the same rate of speed as the driving shaft 10. The rheostat 45 is placed in the circuit to vary the resistance to properly control the current to the coils.

Positioned in axial alinement with shaft 10 is a driven shaft 46 which may be adapted to drive any suitable load. This driven shaft may be journaled in housing 12 as shown in Fig. 1 to maintain the shafts in proper alinement; however, this may be accomplished in many other suitable ways than that one now in common usage. Keyed to shaft 46 at 47 is an armature 48 made up of a solid center portion 50 to which is secured a series of laminated pole pieces 52 which correspond in number to the poles 16.

Each pole piece 52 is provided with a coil 54 of conducting material and these coils are connected in series in such a manner as to cause adjacent poles to have opposite polarity when a proper electric current is passed through the circuit. This series of coils 54 is furnished direct current from the exciter dynamo 22 through wires 56 and 58 which are joined to wires 30 and 32 respectively and to the brushes 60 and 62 which contact slip rings 64 and 66 respectively. These slip rings are securely attached to drive shaft 46 and in series with coils 54. Each of the pole pieces 52 is provided at its outer edge with a series of copper bars 68 positioned parallel with shaft 46 with their ends connected with short circuiting rings 70, thus forming the well known squirrel-cage commonly used as a secondary winding for an induction motor. The housing 12 with its attached parts and the armature 48 comprise two members positioned one within the other and fixed respectively on two rotatable shafts that are in alinement. These two members are spaced apart a slight distance to form an air gap therebetween.

It is desired to close the circuit to coils 54 only when the two members have attained predetermined relative speed, and for this purpose the specially constructed automatic switch or relay 72 is placed in the armature coil circuit. This switch 72 is so constructed that it may be adjusted to close the circuit at any predetermined frequency of the current set up in the armature. While this type of switch is described, yet it is apparent that other means including purely mechanical construction might be used effectively to obtain the desired results.

Switch 72 is shown more in detail in Figure 3, and consists of an arm 74 pivotally mounted at 76 and provided with an armature 78 formed integral therewith. Armature 78, during the starting period, is held down by the magnetic pull of coil 80 which is in circuit with coils 54 through the bushes 60 and 62. In the circuit with coil 80 is a switch 82 which is held in the closed position during the time that arm 74 is in the open or raised position, and which is in the open position when said arm moves downwardly to the closed position, which arm 74 would normally move from the open to the closed position by gravity, yet it is deemed best to provide a spring 86 which retracts to draw the arm to the closed position when the frequency of the current passing through coil 80 is decreased to a predetermined amount.

In the circuit as above described it is very evident that as the frequency decreases the current passing through the coil 80 also decreases, thus permitting the release and closing of switch 72. This type of switch has been shown because of its simplicity; however, it is very apparent that a primarily frequency responsive switch might be substituted for 72 without altering the general functioning of the device.

In the operation of this power transmission it is assumed that shaft 10 with its connected parts, including the electro-magnets, is being driven at a substantially uniform rate of speed by a prime mover that is suitable to drive the load that is to be driven through the means of the transmission and driven shaft 46. With the rheostat in the off position as shown in Fig. 1, the armature 48 and shaft 46 will remain stationary. Switch 72 is in the open position and will not close until a certain relative speed of the two members is attained as hereinafter set forth.

Since the starting torque of the driven load is relatively high, the load is accelerated by means of rheostat 45 which varies the resistance in the circuit of the direct current from the exciter 22 to the coils 20. As rotating energized field cuts the lines of force of the armature a heavy current is induced in the squirrel cage, so that the armature will rotate in the same direction as the fields, and at an acceleration governed by the rheostat. After the starting torque has been overcome the armature will lag behind the rotating field enough to cause the cutting of a sufficient number of lines of force to maintain the driven load at a constant speed. This slip varies, but usually is about four percent at full load.

When this minimum slip has been reached it is desired to sufficiently energize the field coils and the armature coils so that a sufficient magnetic flux will be produced to cause the fields and armature to rotate at the same rate. This is accomplished by the closing of the automatic switch or relay 72 when the predetermined frequency of the induced alternating current in coils 54 is reached. It is well known that the frequency of the induced current varies as the relative speeds of the field and armature vary. When switch 72 is closed a direct current from the exciter energizes coils 54 as well as the field coils 20. This causes the armature to lock itself with the rotating field with the north poles of the field attracting the south poles of the armature and vice versa. Thus the two members will rotate in absolute synchronism and will so continue as long as the prime moving force is sufficient to drive the load at its attained speed.

By proper connections the switch or relay is closed by means of the predetermined low frequency current produced in the coils 54 when the minimum slippage between the two series of electro-magnets is reached and when said switch is closed the combined force of the squirrel cage and the direct-current energized coils 54 will be sufficient to step the two rotating members into synchronous movement after which they will be held in locked position under normal running conditions.

When these two rotating members become synchronized there will be no relative movement of the members, therefore no lines of force will be cut and no alternating current induced in the squirrel cage or armature coils, thereby eliminating the usual alternating current losses such as hysteresis, and eddy currents in the laminations, copper losses in the squirrel cage windings, etc. Should the load become too great for the electro-magnet force to carry the armature will fall out of step with the rotating field and again induce alternating current in the squirrel cage and drive the load at a slower rate of speed until such time when the load lightens when the speed of the two members will again lock in step. With this electro-magnetic connection of parts no sudden shocks or vibrations will be imparted to either the driving or driven members.

The present electro-magnetic power transmission above described is adapted to start a load, accelerate its movement and lock the driving and driven members together so that they are synchronized while in spaced apart relation.

Having thus described the invention, what is claimed as new and desired to be secured by Letters Patent is:

1. An electro-magnetic power transmission comprising two members positioned in operative relation and fixed respectively to a driving shaft and a driven shaft in axial alinement; a series of electro-magnets carried by one of said members; a series of electro-magnets and a squirrel cage winding carried by the other of said members; electrical means whereby said first named series of electro-magnets is energized to drive said second named member and whereby said second named series of electro-magnets is energized when a predetermined relative speed of the two members is attained.

2. An electro-magnetic power transmission comprising two members, in operative relation, respectively, fixed to a driving shaft and a driven shaft in alinement; a series of electro-magnets carried by the member mounted on said driving shaft; a series of electro-magnets carried by the member fixed to said driven shaft; cylindrical arranged copper bars with their ends connected with short circuiting rings carried by the member fixed to said driven shaft; and electrical means whereby said first named series of electro-magnets is energized to drive said second named series of electro-magnets at an accelerating speed and then to synchronize the speed of both series of electro-magnets.

3. An electro-magnetic transmission comprising a series of electro-magnets carried by a driving shaft; a series of electro-magnets and a squirrel-cage winding mounted on a driven shaft and in operative relation with said first named series of electro-magnets; and electrical means adapted to first energize the magnets on said driving shaft to rotate said driven shaft and then to energize both series of electro-magnets to rotate both shafts at the same speed.

4. An electro-magnetic transmission comprising a series of electro-magnets cylindrically arranged and fixed to a driving shaft; a series of electro-magnets and a squirrel-cage winding arranged in operative relation with said first named series of electro-magnets and fixed to a driven shaft; and electrical means whereby said first named series of electro-magnets is energized, while being rotated, to drive said driven shaft up to a predetermined speed when the other of said series of electro-magnets is energized to lock together the two series of electro-magnets to synchronize the movement of the driving and driven shafts.

FANNON F. BEAUCHAMP.